United States Patent [19]

McAllister et al.

[11] 4,093,981
[45] June 6, 1978

[54] DATA COMMUNICATIONS PREPROCESSOR

[75] Inventors: John P. McAllister, Wayne, Pa.; Franklin Theodore Schroeder, Goleta, Calif.; Charles Terrance Stimson, West Chester, Pa.

[73] Assignee: Burroughs Corporation, Detroit, Mich.

[21] Appl. No.: 653,087

[22] Filed: Jan. 28, 1976

[51] Int. Cl.² .......................... G06F 13/00; G06F 3/00
[52] U.S. Cl. .................................................. 364/200
[58] Field of Search ........................ 340/172.5; 445/1; 364/200 MS File, 900 MS File

[56] References Cited

U.S. PATENT DOCUMENTS

| | | | |
|---|---|---|---|
| 3,453,600 | 7/1969 | Stafford et al. | 340/172.5 |
| 3,564,509 | 2/1971 | Perkins | 340/172.5 |
| 3,766,526 | 10/1973 | Buchanan | 340/172.5 |
| 3,768,076 | 10/1973 | Recoque | 340/172.5 |
| 3,825,905 | 7/1974 | Allen | 340/172.5 |
| 3,828,325 | 8/1974 | Stafford et al. | 340/172.5 |
| 3,842,405 | 10/1974 | Key et al. | 340/172.5 |
| 3,909,799 | 9/1975 | Recks et al. | 340/172.5 |

*Primary Examiner*—Mark E. Nusbaum
*Attorney, Agent, or Firm*—Edward J. Feeney, Jr.; Edmund M. Chung; Leonard C. Brenner

[57] ABSTRACT

A microprogrammable data communications preprocessor exercises detailed control over a multiplicity of data lines communicating with a microprogrammable central processor while requiring central processor attention on a message basis only. Further minimization of central processor intervention is achieved through a direct memory access channel which permits data transfer directly from the preprocessor to the main memory of the central processor. The preprocessor also includes a line adapter associated with each data communications line for interface purposes, a scratch pad memory for storing data line parameters, and a microprogrammable serial byte microprocessor. Operational speed is enhanced through the inclusion of automatic operation logic which effectively by-passes the serial byte microprocessor for an automatic transfer of two bytes of data.

2 Claims, 11 Drawing Figures

| MSB | | | | | FUNCTION CODE | | LSB | FUNCTION DESCRIPTION | |
|---|---|---|---|---|---|---|---|---|---|
| X | X | X | X | X | 0 | 0 | 0 | IDLE (NO-OP) | |
| INDEX | S-MEN (4) WT+RD/ | DESTINATION | | UPDATE SPM | 1 | 0 | 0 | AUTOMATIC OPERATION (1) | |
| MEM (2) INHIBIT | SMEM (4) WT+RD/ | 0 | 0 | IMMED.(3) INITIATE | | | | MAR | INTERFACE OR |
| SPM (1) LOAD | X | 0 | 1 | 0 | 1 | 1 | 1 | MDR | |
| X | X | 1 | 1 | 0 | | | | NONE | |
| 0 | OVERRUN | | | ENABLE SYNC | | | | RCV | RCV OR XMIT SELECT AND CONTROL |
| | 1 | 0 | 1 | | 0 | 1 | 1 | | |
| 1 | UNDERFLOW | | | RTS DELAY | | | | XMIT | |
| | 1 | 0 | 1 | | | | | | |
| | X | XMIT BREAK | X | | | | | | |
| 0 | X | 32-BYTE PAGE NO. 2¹ 2⁰ | | 0 | 0 | 1 | 0 | SPM PAGE SELECT | |
| 1 | X | X | X | 0 | | | | SET STATUS INT TO CPU | |
| 0 | BIT SELECTION RCV OR XMIT STATUS 2² 2¹ 2⁰ | | | RCV =0 STATUS | 1 | 0 | 1 | RCV STATUS | |
| | | | | XMIT =1 STATUS | | | | XMIT STATUS | |
| 1 | X | X | X | ADAPT =0 DESCR | | | | ADAPT. DESCR. | |
| | | | | LINE =1 FREQ | | | | LINE FREQ. | |
| 0 | BIT SELECTION MGR STATUS | | | MGR STATUS =0 | 1 | 1 | 0 | MGR STATUS ONLY | MGR STATUS |
| | | | | LINE =1 SELECT | | | | LINE SELECT | |
| 1 | 2² | 2¹ | 2⁰ | DATA SET DESCR. =0 | | | | DATA SET DESCR. | |
| | | | | N.A.=1 | | | | NONE | |

NOTES:
(1) 16 BIT SERIAL DATA OPERATION; MPU 21 IS STOPPED
(2) IF SET, ALLOWS MAR 55 TO BE USED AS SCRATCH PAD REGISTER, OTHERWISE MEM OP AFTER 2ND OUT 2.
(3) MAR 53 MUST CONTAIN DESIRED ADDRESS FROM PREVIOUS USE.
(4) MEM READ TURNS MPU 21 OFF UNTIL READ IS COMPLETE. ALSO, WHEN A DMA READ IS PERFORMED, BOTH MAR 53 & MDR 55 WILL BE LOADED WITH THE DATA READ FROM MAIN MEMORY 28.

Fig. 5

ADAPTOR I/O REGISTER

| MSB | | | | | | | LSB | COMMENT |
|---|---|---|---|---|---|---|---|---|
| 2ND STOP | STANDBY RATE | RATE | NEW SYNC | DEMODE | DTR | ORIG | RTS | DATA SET DESCRIPTOR |
| RCV PARITY | EVEN | ASYNC | CH Y | SIZE X | XMIT PARITY | ENABLE XMIT | ENABLE RCV | ADAPTER DESCRIPTOR |
| MSB 7 | 6 | 5 | 4 | 3 | 2 | 1 | LSB 0 | RCV DATA CHARACTER LESS THAN 8 BITS IS RIGHT-JUSTIFIED. |
| MSB 7 | 6 | 5 | 4 | 3 | 2 | 1 | LSB 0 | XMIT DATA CHARACTER LESS THAN 8 BITS IS RIGHT-JUSTIFIED |
| - | - | - | - | $2^3$ | $2^2$ | $2^1$ | $2^0$ | LINE SELECT (SEE NOTE 1) |
| $2^3$ | $2^2$ | $2^1$ | $2^0$ | - | - | - | - | LINE FREQUENCY SELECT |

NOTE 1: THIS FUNCTION SELECTS WHICH LINE ADAPTER 19 ALL OTHER WORDS APPLY.

*Fig. 7*

STATUS WORD AND BIU

| MSB 7 | 6 | 5 | 4 | 3 | 2 | 1 | 0 LSB | COMMENTS |
|---|---|---|---|---|---|---|---|---|
| 7 | 6 | 5 | 4 | 3 | 2 | 1 | 0 | SPM BIT SEL. |
| - | - | - | - | RESET DWI | AUTO OP AOV | TI | DWI | MGR STATUS |
| XMIT EXCEPTION | CTS/ | NOT USED | DSR/ | BREAK | LINE/ | LINE CHG | BMT | XMIT STATUS |
| EXCEPTION | PARITY ERROR | CARRIER/ | DSR/ | BREAK | RING | CARRIER LOST | BFUL | RCV STATUS |

*Fig. 8*

| MSB 7 | 6 | 5 | 4 | 3 | 2 | 1 | 0 LSB | COMMENTS |
|---|---|---|---|---|---|---|---|---|
| CHAR OR BIT/ | WRITE OR READ/ | SET/ RESET OR UPPAGE | $CH2^4$ | $CH2^3$ | $CH2^2$ | $CH2^1$ | $CH2^0$ | CH MODE |
| | | | BIT $2^2$ | BIT $2^1$ | BIT $2^0$ | $CH2^1$ | $CH2^0$ | BIT MODE |

SET AND RES/ USED ONLY IN BIT MODE

*Fig. 9*

DATA COMMUNICATIONS PREPROCESSOR

CROSS REFERENCE TO RELATED APPLICATIONS

The microprogrammable data communications preprocessor of the present invention cooperates in a data communications system employing a microprogrammable central processing unit. In the preferred embodiment, the central processor is of the type disclosed in copending application Ser. No. 825,569 for "Polymorphic Programmable Units Employing Sub-Instruction Sets" filed May 19, 1969 in the name of U. Faber et al. Further, the preferred embodiment utilizes a central processing unit having a port select unit (PSU) of the type disclosed in copending application Ser. No. 392,116 for "Dynamic System Firmware" filed Aug. 27, 1973 in the name of K. Kistler et al.

The data communications preprocessor of the present invention employs a microprogrammable serial byte microprocessor of the type disclosed in U.S. Pat. No. 3,878,514 issued to U. Faber on Apr. 15, 1975 for an "LSI Programmable Processor" filed Nov. 20, 1972. More specifically, the preferred embodiment of the present invention uses an improved version of the Faber processor of the type disclosed in copending application Ser. No. 455,060, now U.S. Pat. 3,972,024, for "An Improved Programmable Microprocessor" filed Mar. 27, 1974 in the name of F. Schroeder et al.

The above-cited cross references provide much useful technical and background information which is not unnecessarily repeated in the present specification. Therefore, a review of these cross references will aid in an understanding of the present invention.

BACKGROUND OF THE INVENTION

The present invention relates to a microprogrammable preprocessor for interfacing between a multiplicity of data communications lines and a central microprogrammable processor by tending to the detailed line procedures and requiring central processor intervention on a message basis only.

A data processing communications system generally includes a central processing unit (CPU) and a plurality of data communications channels including direct connect lines, MODEMS, and the like. As the system becomes more complex, inefficiencies increase as the CPU data processing functions are interrupted more frequently for line procedures and data communications details. The addition to the system of a microprocessor to handle line procedures and details may relieve the CPU of these burdens but may otherwise limit the data communications aspects of the system to the necessarily limited capabilities and throughout speed of the microprocessor.

OBJECTS AND SUMMARY OF THE INVENTION

Therefore it is an object of the present invention to provide a high speed, flexible, data communications preprocessor.

It is a further object of the present invention to provide a microprogrammable data communications preprocessor for use with a microprogrammable CPU in a data communications system.

A data communications preprocessor constructed in accordance with the present invention includes a line adapter associated with each data communications line for interface purposes, a scratch pad memory for storing the data line parameters of each data line and a microprogrammable serial byte microprocessor for exercising detailed control over a plurality of data communications lines while requiring central processor intervention on a per message basis only. Operational speed is enhanced through a direct memory access channel which permits data transfer directly from the preprocessor to the main memory of the central processor, and through the inclusion of automatic operation logic which effectively by-passes the serial byte microprocessor for an automatic transfer of two bytes of data.

The system configuration and operational details given above have been presented in simplified form. Other objects, features, and advantages of the invention will be apparent from the following description of the preferred embodiment of the invention and the accompanying drawings thereof.

BRIEF DESCRIPTION OF THE DRAWINGS

FIG. 5 is an illustration of the word format of transmit status, receive status, line frequency select, and adapter descriptor control words;

FIG. 7 is a representation of an adapter I/O register used in the preprocessor of FIG. 4;

FIg. 8 is a representation of the status words and bit isolation unit used in the preprocessor of FIG. 4;.

FIG. 9 is an illustration of the scratch pad memory addressing and control instructions used for the scratch pad memory of FIG. 3;

GLOSSARY OF ABBREVIATIONS AND ACRONYMS

Following is a listing of abbreviations frequently used in the detailed description of the preferred embodiment of the invention and related cross referenced.

| | |
|---|---|
| A0 - A4 | SPM Address (Char.) |
| ADDOUT | Adder Output |
| ADPCLR | Adaptor Clear |
| AOV | Adder Overflow |
| ASF | Auto Sequence |
| ADF.D/ | |
| | Auto Sequenc Second Char. Time |
| ASYNCLK n/ | Asynchronous Clock (To Adaptor) |
| AUTOOP | Auto OP Time |
| BA 2F/ | ASF 2nd Char. Time |
| CDSCLKPn | CPU Clock |
| CLBMIRO3 | MIR Bit 3 |
| Compel/ | Compute Delay |
| CPIN | CLK Pulse |
| D/ | Auto OP 2nd Char. Time |
| DATAIN | MPU Data Input |
| DATAO | MPU Data Output |

-continued

| | |
|---|---|
| DATARD/ | Read Data to CPU |
| DDPDESn | Enable Adaptor n Descriptor |
| DEVOF | Device 0 |
| DEFIF | Device 1 |
| DEV3F | Device 3 |
| DEVWT/ | Device 1 and SPM Write |
| DIRO/ - DIR 7/ | Adaptor I/O Bits |
| DMARD | DMAC Read From CPU |
| DMAWT/ | DMAC Write to CPU |
| DTR | Data Terminal Ready |
| ENSYN | Enable Sync Detect |
| EXT | MPU External Interrupt |
| EXTEN | Enable External Bus |
| EXT 01/ - EXT 16/ | External Bus |
| FCD 000-111 | Function Control Register (FCR) Operation Codes |
| LAST SB | Last Strobe |
| LUMIR01/-LUMIR 16/ | MIR Bus |
| MAR DATA | MAR Data (card to card and serial) |
| MAR OUT | MAR Output (serial) |
| MAR SEL | MAR Serial Input Enable |
| MD01/ - MD 12/ | MPM Memory Data |
| MDR DATA | MDR Data |
| MDR OUT | MDR Output (serial) |
| MDR SEL | MDR Serial Input Enable |
| PAGE 1/ | Page Select in SPM |
| PE | Parallel Enable (MAR & MDR) |
| PRESB | Prestrobe |
| PRESBD | Prestrobe Delayed |
| PSINSTn | Instruction Bit from CPU |
| PS READn | CPU Read |
| PS WRITEN | CPU Write |
| RASF | Reset ASF |
| RQ/ | Request |
| RQSTL/ | Request to Steal |
| RST/ | Request to Send |
| SELDATA | MDR or MAR, Data Output |
| SETASF/ | Set Auto Sequence |
| SETDES | Data Set Descriptor Enable |
| SINT/ | Status Interrupt to CPU |
| SIOOUT/ | SPM I/O SErial Output |
| SMADR 01/-SMADR 16/ | CPU Memory Address |
| SPMIN0-SPMIN7 | SPM Input Bits |
| SPM OUT 0/-SPMOUT 7/ | SPM Output Bits |
| STINT/ | Soft Status Interrupt From CPU |
| STLG | Steal Granted |
| WRITE | CPU Write |
| WT/ | SPM Write |
| XCLK | Transmit Clock |
| XDATA | Transmit Data |
| XMITSB | Transmit Strobe |
| XMITST | Transmit Status Enable |
| XMODE | Transmit Mode |
| 1st OUT | 1st Output of Auto Sequence |

DETAILED DESCRIPTION OF THE PREFERRED EMBODIMENT

Figure 1:
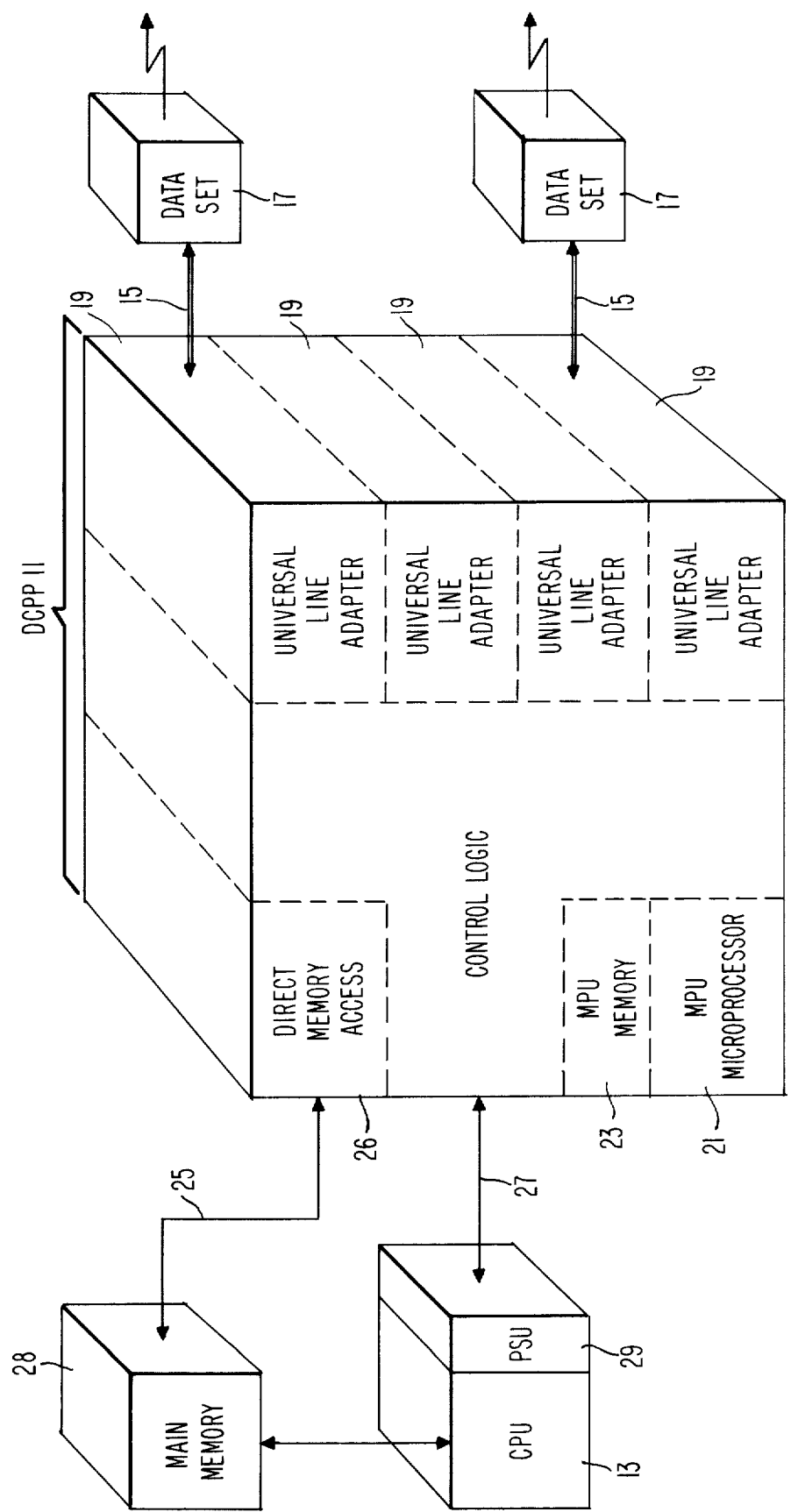
FIG. 1 is a block diagram of a data communications system using the data communications preprocessor of the present invention.

With reference to FIG. 1, the data communication preprocessor, hereinafter called the DCPP 11, of the present invention provides the data communications interface between the central processing unit CPU 13 and multiple data communications lines 15. The data communications interface is with either standard data sets 17 or direct connect lines, and include full duplex, half duplex, synchronous, and asynchronous applications. Each data communication line 15 serviced requires an individual line adapter 19. Each line adaptor 19 contains the transmit and receive logic necessary for transferring data to and from the data communication line 15, and the logic required to control the communication interface, both for normal operating control and status interrogation.

The DCPP 11 incorporates its own microprocessing unit, hereinafter called the MPU 21, which permits the DCPP 11 to operate in a semi-autonomous mode relative to the CPU 13. The MPY performs many of the functions normally required of a control processor, thus relieving the CPU 13 of much of the burden associated with detailed control of the DCPP 11. The MPU 21 is loadable with commands from the CPU 13 via a DCPP 11 microprogram memory, hereinafter called the MPM 23. The MPU 21 utilizes these commands to generate the internal firmware set used for DCPP 11 function control. Thus, the functional characteristics of the DCPP 11 are determined by the program loaded from the CPU 13. A direct access channel 25 provides for information transfer directly between the direct memory access logic, hereinafter called the DMA 26, in the DCPP 11, and the main memory 28 of the CPU 13. This direct transfer further reduces the need for the CPU 13 intervention.

The DCPP 11 interface 27 with the CPU 13 is via a port select unit, hereinafter referred to as the PSU 29, contained within the CPU 13. The PSU 29 controls and synchronizes the interface 27 between the CPU 13 and DCPP 11. The DCPP 11 acts upon control words from the CPU 13, performs the specified operation, and upon completion of the operation, generates and returns a status word containing operation status and/or error status information.

The primary features of the DCPP 11 are itemized as follows:

1. Multiple data communication lines are serviced concurrently requiring central processor unit CPU 13 attention only a per message basis.

2. Line procedures are handled without CPU 13 intervention. Line procedures are defined by the DCPP 11 microprogram thereby providing application flexibility.

3. Direct memory access enables the DCPP 11 to handle message transfers without intervening the CPU 13 attention; the CPU 13 is notified upon message transfer completion. Buffer area is assigned in the main memory 28 for each line. Buffer size and location is specified by the CPU 13.

4. Upon exceeding a specified number of retries for a message, or upon line failure, the DCPP 11 status word is up-dated accordingly and the CPU 13 is interrupted. Failure on one line will not effect transactions on another line.

5. The data communications line adaptor 19 is designed to interface with the standard data sets 17 or direct connect line including full or hald duplex, synchronous or asynchronous applications. Standard baud rates from 75 to 19.2K baud are programmably selectable. The data communication line adaptor 19 can be preset for most line requirements by programmatic control.

Figure 2:
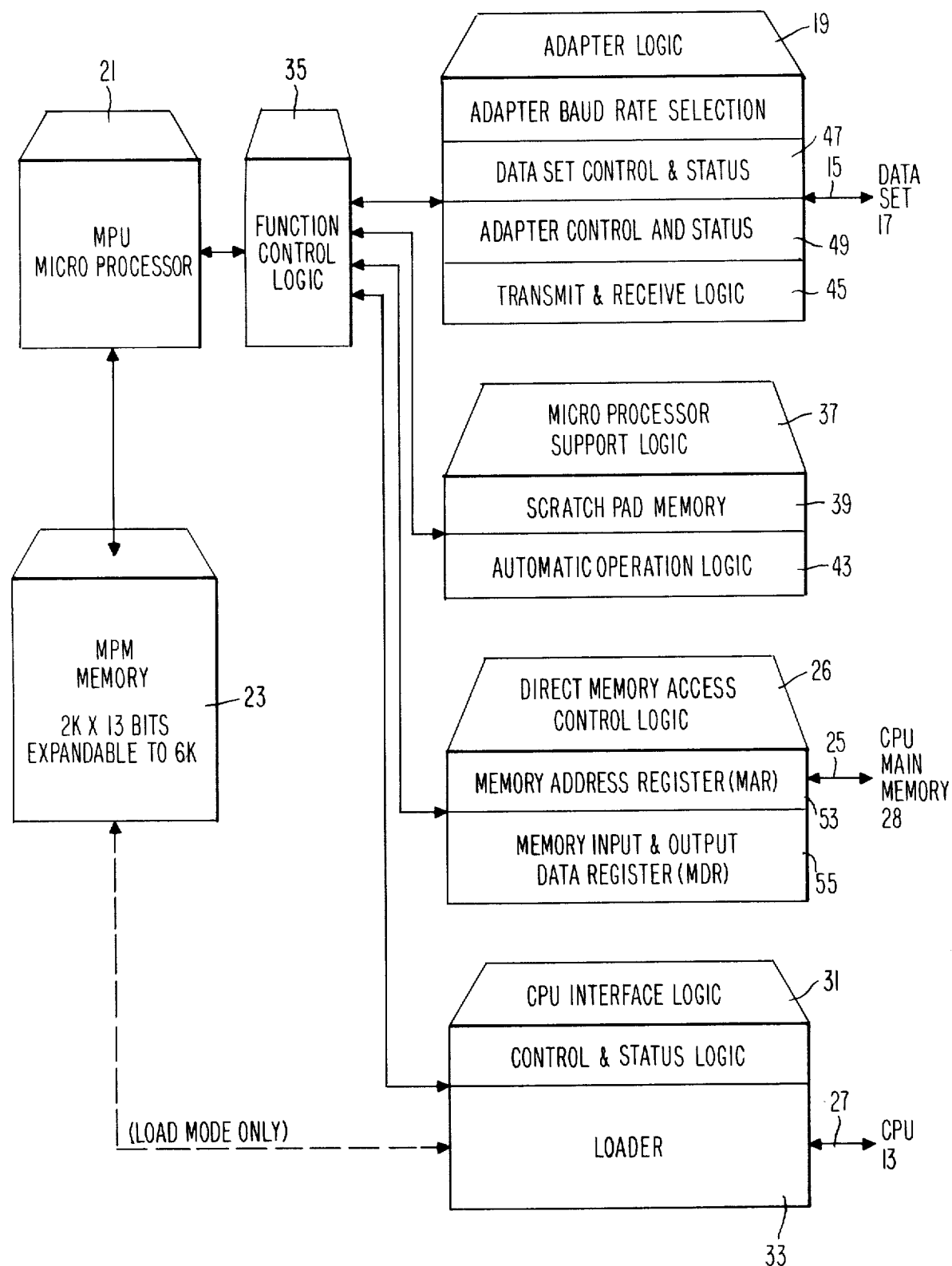
FIG. 2 is a block diagram of the data communications preprocessor of the present invention.

FIG. 2 is a functional diagram of the DCPP 11. The diagram shows the following functional blocks:

The CPU 13 interface logic 31, the loader 33, the MPM 23, the MPU 21, the function control logic 35, the microprocessor support logic 37, the direct memory access logic 26, and the universal line adaptor 19. Each of these functions is briefly described below.

The CPU interface logic 31 allows the CPU 13 to load or modify the contents of the memory MPM 23. This provides the CPU 13 with complete control over the program contents of the MPM 23 memory. The CPU interface logic 31 permits the CPU 13 to direct DCPP 11 operations such as transmit data, receive message, disconnect line, etc. The CPU interface logic 31 also allows the DCPP 11 via status interrupt to report status to the CPU 13.

The loader logic 33 is used only when the CPU 13 loads or modifies the DCPP 11 microprogram memory MPM 23. The CPU 13 selects load mode via a control word register. In load mode, random or sequential loading of the microprogram memory MPM 23 is possible.

The MPM 23 stores program information for the microprocessor MPU 21. The storage capacity is expandable in the preferred embodiment from 2k to 6k words, in 2K word increments. Each word consists of 13 bits (12 data bits plus one parity bit).

The microprocessor MPU 21 controls the operations of the DCPP 11. It initiates and executes line message transactions and special functions as directed by the CPU 13. When a plurality of lines are active, the microprocessor MPU 21 will sequentially interrogate each line adaptor 19 and provide service on an as-requested basis. In the preferred embodiment the microprocessor MPU 21 contains an eight bit wide arithmetic unit and performs instructions at a one megaHertz rate.

The function control logic 35 allows the microprocessor MPU 21 to address and transfer information to and from other functional units including up to four line adaptors 19.

In the microprocessor support logic 37, a scratch pad memory 39 provides temporary data storage for the microprocessor MPU 21. The scratch pad memory 39 is used to store information for each data communication line 15 such as buffer location in current address, line procedure details, job description, current status, etc. Thus, the scratch pad memory 39 is used by the microprocessor MPU 21 to keep track of what the DCPP 11 is doing. In the preferred embodiment the scratch pad memory 39 is expandable as the number of data communication lines 15 is increased. A storage capacity of up to 128 bytes per data communication line 15 is provided. The microprocessor support logic 37 also includes the automatic operation logic 43.

The direct memory access (DMA) logic 26 provides the DCPP 11 with a direct access path to the main memory 28. The main memory 28 is used for message input and output buffering for each data communication line 15. In addition, the main memory 28 is used to store control and data descriptors for each data communication line 15. The main memory 28 which is accessed both by the CPU 13 and the DCPP 11 is used as the transfer medium for the exchange of data and control of result descriptors.

The data communication line adaptors 19 provides the interface between the DCPP 11 and the data sets 17 or direct connect lines. An individual line adaptor 19 is required for each data communication line. It contains transmit and receive logic 45 capable of operating at selectable baud rates, synchronous or asynchronous and full or half duplex. The microprocessor MPU 21 controls the functional operation of the data set 17 and line adaptor 19 by means of control descriptors. The microprocessor 21 interrogates the line adaptor 19 status and the data set 17 status by reading the respective status register in the included data set control and status logic 47 and the adaptor control line status logic 49.

The DCPP 11 with its own microprocessing unit 21 is a programmable multiline control device dependent port (DDP). In combination with a CPU 13 an overall data communications system consists of two processors, each able to operate independently by containing an interpreter and program within its own memory. The first processor, the CPU 13, has control of the usual peripherals whereas the second processor, the DCPP 11, controls up to four data communication lines 15. Since the processor DCPP 11 is microprogrammable a program language, NDL (network definition language) is provided in the preferred embodiment to handle the data communication aspects. In order that data received by the DCPP 11 can be, for example, printed, there has to be a means of communications between the DCPP 11 and the CPU 13. When a message is received by the DCPP 11 the NDL program will cause it to be stored in an area of the DCPP 11 to which the CPU 13 has access. This may be termed a receive buffer. Likewise, the CPU 13 may desire to read a keyboard message and sent it to a terminal. Therefore, as well as the receive buffer there must also be a transmit buffer. In order that data programs being run may be related in some way, one processor or the other must have ultimate control. The CPU 13 is given this ultimate control. The program it is running is the main program which will, for example, contain data it wishes to send to a data communication line 15 from some peripheral and decide which terminal to send it to. Thus the source language has instructions such as "transmit message to___. " These instructions are decoded by the data communications controller portion of the source language and formatted to suit NDL. This is stored in an area of memory considered the operation buffer. Now it can be clearly seen that the NDL program and the DCPP 11 can investigate an instruction in the operation buffer. Dependent on this instruction it will branch through a specific routine. The NDL instructions within the subroutine will be broken down into microstrings by the NDL interpreter and performed by the hardware.

The NDL program is specific to a given network of terminals. It will provide all the necessary controls for that network, determining such things as: is the requested terminal valid, is it already busy, how often should it be serviced, what is its line frequency, what line is it on, etc. Thus the main source language program needs only to say "send this message to terminal ___" and NDL along with DCPP 11 does the rest.

As part of the pairing-up procedure a warm start is performed wherein the NDL is read from a disc and stored into the DCPP 11 memory. This is done by the usual peripheral control method of control words and data words. Once loaded the DCPP 11 is inhibited from operation until suh time as a program is initiated which requires data communication.

When a data communication program is called from disc into the main memory 28, the first part of the load operation loads any soft controllers, followed by a special instruction set of source level data communication instructions.

In the preferred embodiment, a set of NDL tables are produced containing information about software to be used (size-location number of entries - size of transmission, etc.), the lines in use (speed-number of stations - delays, etc.), the stations in use (description of terminal - type of parity-frequency-buffer size, etc.), and many other parameters used for operation. Each table also references the location of the next in chain, but this reference is calculated at the NDL program load time.

Once loaded, the NDL program will start automatically. It releases the DCPP 11 for operation and selects from the NDL tables the various words frequently used and stores information relating thereto in the internal scratch pad memory 39 for fast access. The information stored contains the reference addresses to the NDL tables, the start address of a microstring to be returned to, the address of the CPU 13 memory of the next NDL instruction, etc. Once the initial process is completed the NDL program goes into idle where it waits for further instructions from the main program.

Figure 3:
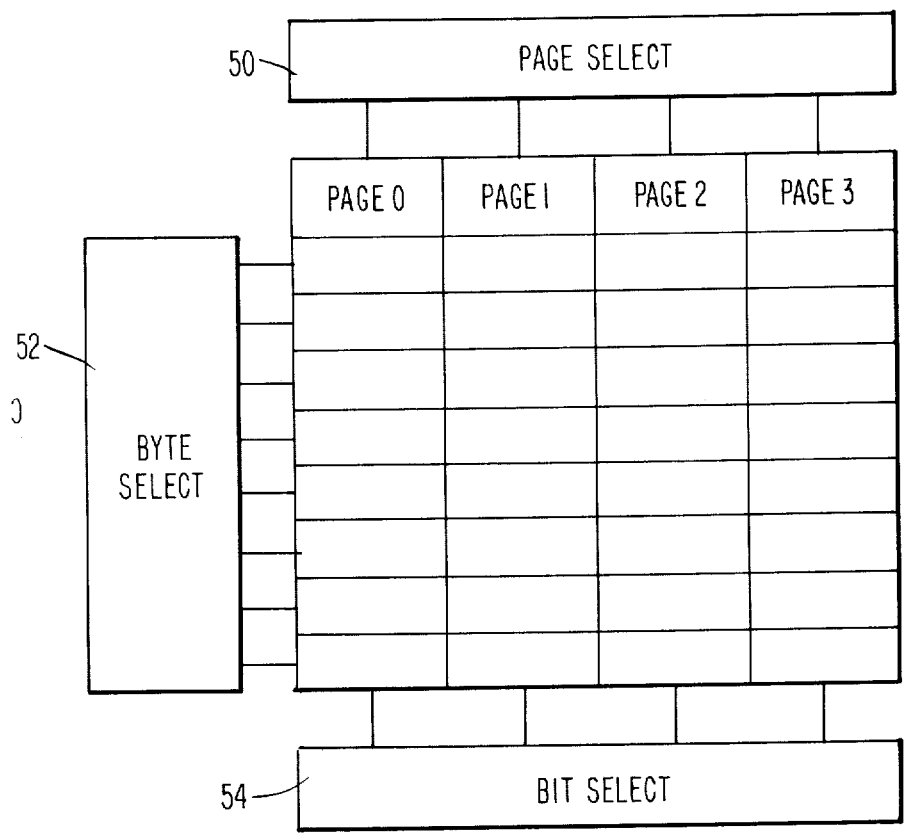
FIG. 3 is a diagram of the scratch pad memory used in the preprocessor of FIG. 2.

A very important feature of the DCPP 11 is the scratch pad memory 39. With reference to FIG. 3, the scratch pad memory 39 contains in the preferred embodiment 512 one-byte word locations. Since there can be up to four data communication lines 15, and since the memory is divided into four blocks of 128 bytes with one block allocated per line, part of the scratch pad memory 39 addressing is devoted to selecting the direct block of 128 bytes. Each block of 128 bytes is subdivided by page addressing logic 50 into four pages of 32 bytes each. Within a selected page, byte addressing logic 52 selects a specific byte. As will be detailed hereinafter, bits of four bytes in each page may be isolated and selected by further address logic 54. In the preferred embodiment, two pages of scratch pad memory 39 (64 characters or bytes) are required to handle a half duplex communications line and four pages to handle a full duplex communications line.

In operation, the DCPP 11 fetches an NDL instruction from the main memory 28 and decodes it into OP code. Performance of the OP code may require data to be transferred to or from main memory 28. This is done by stealing. A status word is used to indicate to the CPU 13 a microprogram memory 23 or a scratch pad memory 39 error in the DCPP 11. If this condition occurs a status interrupt is sent to the CPU 13 and the MPU 21 is inhibited from running.

In the initiation of information transfer between the CPU 13 and the DCPP 11, the port select unit 29 decodes the three bit groups from the CPU 13 to completely define the operation that is to take place. The command field (nanobits 51 through 54) establishes whether the operation is to be a device read or a device write. The four least significant bits contain the specific device write, and the most significnt bits in conjunction with the command type distinguishes between control, data, and status words.

MAIN PROCESSOR — PREPROCESSOR INTERFACE

The interface between a microprogrammable processor and a microprogrammable microprocessor is not characterized by a complex array of hardwired logic interconnections but rather by the control, data, and status words that the two processors use to communicate with and to control each other. Four basic word formats are used to tranfer control, data and status information between the main processor CPU 13 and the preprocessor DCPP 11. Each word format comprises 16 bits with the first bit designated as the most significant bit (MSB) and the sixteenth bit as the least significant bit (LSB). The four basic word formats are a control word (DW·INST), a write data word (DW·INST), a read data word (DR·INST/), and a status word (DR·* INST). The significant bits of the four basic word formats are detailed below.

CONTROL WORD (DW·INST).

DW·INST allows the CPU 13 to perform the following:

Bit 1: Enter or exit load mode. Load mode enables the CPU (via DW·INST/) to load or verify the contents of the MPM 23 or to have the MPU 21 operate using the MIR bus 51 as an instruction source.

Bit 2: Clear MPU 21 MPCR. Used only in conjunction with enter or exit load mode. Clear MPU 21 MPCR provides the capability to start loading or execution at either MPM 23 location zero or the current address.

Bit 3: Clear DCPP 11. Sets or resets the clear DCPP 11 flip-flop. The clear DCPP 11 if set will hold the DCPP 11 in a cleared state. Once set it will remain set until a command is received to reset it.

Bit 4: MTR Override. When set, inhibits SPM 39 or MPU 21 parity errors from shutting off run.

Bit 15: Execute mode. Used by MTR to disable writing into MAR 53 and MDR 55 from the MIR but 51 with a data write (DW·INST/). Also, disables MTR request to steal.

Bit 16: MTR Mode.
Used by MTR for the following:
1. Disables MAR select.
2. Enables parity error while in load mode.
3. Complements MPM 23 parity checkergenerator.
4. Gates ASYNCLKO to DINT.
5. Complements SPM parity generator.

DATA WORDS (DW·INST/ or DR·BEX·INST/)

A DR·BEX·INST/ will transfer the contents (16 bits) of the MDR 55 into the B-register of the CPU 13.

A DW·INST/ will transfer 16 bits of MIR data into MAR 53 and MDR 55. If in load mode, the following functions are also enabled:

1. If MIR01 and 02 are both zero than MIR06-16 (12 bits will be loaded into the MPM 23 at the address defined by the MPU 21 MPCR and then the MPU 21 MPCR will be incremented.
2. IF MIR01 (EXECUTE INST) is set then MPU 21 will execute the instruction (12 bits) contained in MIR05-16, thus the CPU 13 can single-step instructions to MPU 21 and/or DCPP 11.
3. If MIR01/ and MIR02 (MPU 21 to MDR 55) is set then a copy of the instruction in MPM 23 location per MPU 21 MPCR is transferred into the MDR 55 and MPU 21 MPCR is subsequently incremented. This feature is provided to allow the CPU 13 to read and check the contents of the MPM 23 after loading.
4. If MIR03/ (MTR STEAL) is set, the CPU 13 will execute an MRT request to steal. This allows CPU 13 to execute a cycle steal independent of MPU 21. The MTR data word (DW·INST/) is defined as follows:

| MTR MODE | EXEC MODE | LOAD MODE | DW | INST | MIRO1 | MIRO2 | MIRO3 |
|---|---|---|---|---|---|---|---|
| 1 | 0 | 0 | 1 | 1 | 0 | 0 | 1 |

This mode enables the CPU 13 to generate a steal cycle from a data write. The address is determined by the previous data loaded into MAR 53.

5. The MTR parity bit is used by the MIR to bring the parity bit to the MDR 55 and MAR 53 registers for testing.

The following listing describes functions of various combinations of control and data words.

| DATA WORDS (DW · INST/ OR DR · BEX · INST/) | | | | | | | |
|---|---|---|---|---|---|---|---|
| LOAD MODE | DW | DR · BEX | INST | MIRO1 | MIRO2 | MIRO3 | FUNCTION DESCRIPTION |
| 0 | 1 | 0 | 1 | 1 | 0 | 1/0 (note 1) | Enter load mode and reset MPCR 59, thus loading will start at address zero. If MIRO3 = 1, set DCPP 11 clear flip-flop. |
| 0 | 1 | 0 | 1 | 1 | 1 | 1/0 (note 1) | Enter load mode, do not reset MPCR 57. Loading will start at current address. |
| 1 | 1 | 0 | 0 | 0 | 0 | 0 | Load data in MIRO5-16 (complement) into MPM 23 and then increment MPCR 57. |
| 1 | 1 | 0 | 0 | 1 | 0 | 0 | MPU 21 will execute instruction contained in MIRO5-16 (true). MPM 23 is not loaded. |
| 1 | 1 | 0 | 0 | 0 | 1 | 0 | Transfer a copy of instruction from MPM 23 into MDR 55 and MAR 53 and increment MPU 21 MPCR. Note: MIRO5-16 must be all zeroes. |
| X | 0 | 1 | 0 | X | X | X | Transfer contents of MDR 55 into the CPU 13 B-register via EXT bus 59. |
| 1 | 1 | 0 | 1 | 0 | 0 | 1/0 (note 1) | Exit "load mode" and clear MPCR 57, thus MPU 21 program execution will start at location zero. |
| 1 | 1 | 0 | 1 | 0 | 1 | 1/0 (note 1) | Exit "load mode" and do not clear MPCR 57, thus MPU 21 program at current address. |
| 0 | 1 | 0 | 0 | X | X | X | Load contents of MIR (16 bits) into MAR 53 and MDR 55. |
| X | 0 | 1 | 1 | X | X | X | Read Status word to CPU 13 B-register and reset STINT. |
| 0 | 1 | 0 | 1 | 0 | 0 | 0 | Set DCPP 11 DW1 flip-flop in DCPP 11 (normal interrupt to DCPP 11 from MPU 21). (Note 2) |

Notes:
(1) If MIRO3 = 1, then set DCPP 11 clear flip-flop, otherwise reset it.
(2) DWI flip-flop will be set as a result of any DW · INST unless DCPP 11 clear flip-flop is set. Once DWI is set, it will remain set until tested by MPU 21, or until DCPP 11 clear flip-flop is set.

STATUS WORDS (DR·INST).

In addition to device address, the status word contains 4 bits placed on the external bus 57 (EXT1 — 16):

EXT01: Execption bit: This bit is set if either EXT02 or EXT03 is set. This bit is reset when a status read DR·INST) is executed. It is not reset with an enable status (ENST/).

EXT02: MPM23 parity error: This bit is set by a MPU 21 parity error and is reset by a status read or clear DCPP 11. When MPM 23 parity error is set, MPU 21 clock will be stopped.

EXT03: SPM 39 parity error is set by an SPM 39 parity error and is reset by a clear DCPP 11. When SPM 39 parity is set, the MPU 21 clock will be stopped.

EXT04: Run indicate status of DCPP 11. If set, indicates that DCPP 11 is executing instructions. If reset, indicates that DCPP 11 is stopped. This bit is used by MIR only.

STATUS INTERRUPT: This level is set by an MPM 23 or SPM 39 parity error or by firmware control of MPU 21. It is reset upon a status read or clear DCPP 11. If status interrupt is set and the exception bit is not set a "Soft Interrupt" is indicated (normal completion of most operations).

DATA COMMUNICATIONS PREPROCESSOR LOGIC FUNCTIONS

The DCPP 11 includes the following logic (see FIG. 4):

A. Function control register (FCR) 35 — controls data path and functional operations within the DCPP 11.

B. Adapter I/O register 61 — used for exchange of data between MPU 21 and the data comm line adapters 19.

C. Memory address register (MAR) 53 — used to address memory for direct memory access (DMA) operations.

D. Memory data register (MDR) 55 — used for data storage for DMA read or write operations.

E. Bit isolation unit (BIU) 63 — used to select a particular bit of status or SPM information to be applied to the external interrupt input of MPU 21.

F. Scratch pad memory (SPM) 39 — used by MPU 21 for the storage of control information.

G. Automatic operation logic — used for the automatic transfer of 16 bits of information between SPM 39 and working registers. In some cases an index value may be added during the transfer.

H. Adapter 19 — multiple data comm line adapters may be contained in a single DCPP 11. The adapter 19 contains registers and logic as required to interface with data sets 17.

FUNCTION CONTROL REGISTER 35 (DEVO)

Figure 6:
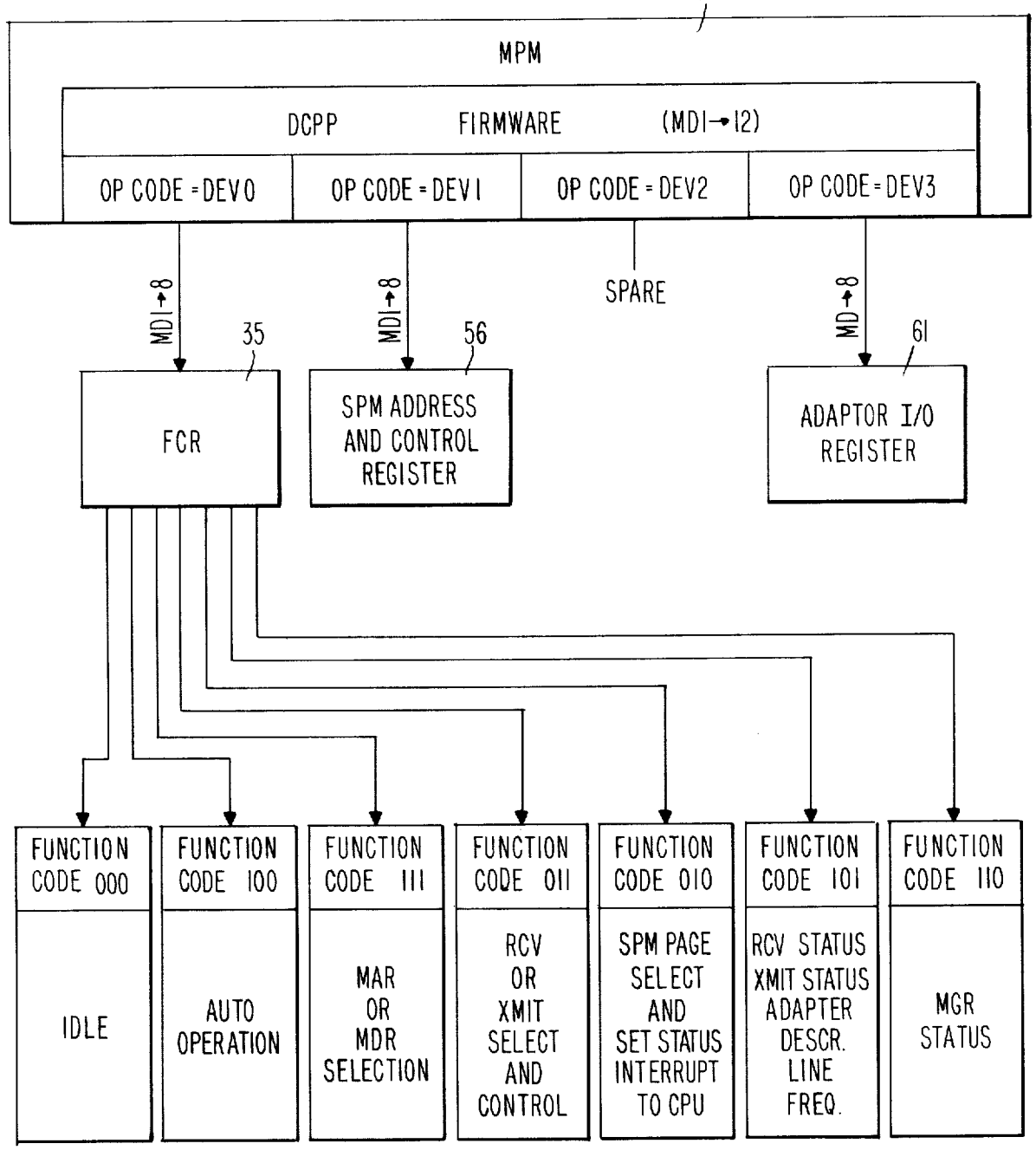
FIG. 6 is a representation of the data paths and logic functions of the preprocessor of FIG. 4.

This register is loaded by an MPU 21 DEVO instruction. It controls the data path and logic functions of the DCPP 11 as shown in FIG. 5 and FIG. 6.

AUTOMATIC OPERATION

A very important feature of the present invention is the capability to automatically transfer two bytes of SPM data not using MPU 21. The starting byte address of the SPM 39 data is defined by a preceding MPU 21 DEVI instruction and must be an even-numbered address. The automatic transfer may include the addition of an index to the SPM 39 data. The index of one byte is contained in the adapter I/O register 61 and is added if the "index" bit is set. The results of the automatic function will be transferred to the register specified by the "destination" bits; also, if the "SPM updata" bit is set, the results will be stored into SPM 39 in place of the original data. When MAR 53 is the selected destination, a DMA operation to main memory 28 is initiated by requesting "steal" upon completion of the automatic transfer. Whether the memory operation is a read or a write is defined by the "DMA write" bit. The clock to MPU 21 will be stopped for the duration of the automatic operation and if a "DMA read" is initiated, the MPU 21 clock will not be restarted until the completion of the memory read operation. It is possible for an automatic operation to result in an overflow. In this case the "auto overflow" flip-flop is set for subsequent testing by MPU 21. The "overflow" flip-flop will not reset until the next "AUTO OP" is initiated. The function code calling forth an automatic operation is 100 in bits MD5-MD8 of a DEVO instruction. Functional descriptions of the automatic operation codes are given below.

AUTOMATIC OPERATION (FUNCTION CODE 100)

| (MSB) INDEX (3) | DATA WRITE | DEST. SELECT | UPDATE SPM | DESTINATION |
| --- | --- | --- | --- | --- |
| 1 | 1 | 0 0 | 0 | Add index contained in adapter I/O register 61 to 2 bytes of SPM 39 data. Load result into MAR 53 and initiate a DMA write operation. (Note 1) |
| 1 | 0 | 0 0 | 0 | Same as above except initiate a DMA read operation. (Note 2) |
| 1 | 1 | 0 0 | 1 | Add index in adapter I/O register 61 to 2 bytes of SPM 39 data. Store result into SPM 39 in place of original data and also into MAR 53 and initiate a DMA write operation. |
| 1 | 0 | 0 0 | 1 | Same as above except initiate a DMA read operation. (Notes 2 and 4) |
| 0 | 1 | 0 0 | 0 | Transfer 2 bytes of SPM data into MAR and initiate a DMA write operation. |
| 0 | 0 | 0 0 | 0 | Transfer 2 bytes of SPM data into MAR 53 and initiate a DMA read operation. (Notes 2 and 4) |
| 1 | 0 | 0 1 | 0 | Add index in adapter I/O register 61 to 2 bytes of SPM data; store result into MDR 55. |
| 1 | 0 | 1 0 | 0 | Add index in adapter I/O register to 2 bytes of SPM data; store result into CRC register 41. |
| 1 | 0 | 0 1 | 1 | Add index in adapter I/O register 61 to 2 bytes of SPM data; store result into MDR register 55 and also into SPM 39 in place of original data. |
| 1 | 0 | 1 0 | 1 | Same as above except CRC register 41 is destination instead of MDR 55. |
| 1 | 0 | 1 1 | 1 | Add index in adapter I/O register 61 to 2 bytes of SPM data. Store result into SPM 39 in place of original data. |
| 0 | 0 | 0 1 | 0 | Transfer two bytes of SPM data into MDR 55. |
| 0 | 0 | 1 0 | 0 | Transfer 2 bytes of SPM data into CRC register 41. |
| 1 | 0 | 1 1 | 0 | Test for AOV. |

Notes:
(1)Codes not shown are not applicable.
(2)Automatic operations require approximately 3.5 microseconds.
(3)Index = add contents of adapter I/O register 61 to least significant 8 bits of AUTO OP; and all zeros to most significant 8 bits of AUTO OP. Carries are propagated from LS through MS byte.
(4)Data read from main memory 28 will be loaded into both MAR 53 and MDR 55.

MAR 53 AND MDR 55 SELECT (FUNCTION CODE 111)
A. MAR 53 SELECT

| MD1 MSB MEM INH | MD2 WT OR DR/ | MD3-4 DEST = MAR | MD5 IMMEDIATE | DESCRIPTION |
| --- | --- | --- | --- | --- |
| 0 | 1 | 0 0 | 0 | MAR 53 is enabled for data exchange with MPU 21 via OUT2 or BEX2. A DMA (main memory 28 write) will follow second OUT2 and MPU 21 will be stopped until the read is complete (Note 3) |
| 0 | 0 | 0 0 | 0 | Same as above except a DMA (main memory 28 read) will follow second OUT2 and MPU 21 will be stopped until read is completed. Data will be loaded into both MAR 53 and MDR 55. |
| 0 | 1 | 0 0 | 1 | A DMA main memory 28 write will commence immediately. Memory address is as per existing contents of MAR 53. |
| 0 | 0 | 0 0 | 1 | Same as above except memory operation will be a read and MPU 21 will be stopped until read is completed. Data will be loaded into both MAR 53 and MDR 55. |
| 1 | 0 | 0 0 | 0 | MAR 53 is enabled for data exchange with MPU |

-continued

MAR 53 AND MDR 55 SELECT (FUNCTION CODE 111)

A. MAR 53 SELECT

| MD1 MSB MEM INH | MD2 WT OR DR/ | MD3-4 DEST = MAR | MD5 IM- MED- IATE | DESCRIPTION |
|---|---|---|---|---|
| | | | | 21 via OUT2 or BEX2. DMA operation is disabled, thus MAR 53 can be used as a scratch pad data register. |

Notes:
(1) Combinations not shown above are not applicable.
(2) DMA operations use MAR for memory address and MDR 55 for memory data, i.e., if memory operation is a read, MAR 53 and MDR 55 will be loaded with data read from main memory 28. In the case of a memory write operation, MDR 55 is previously loaded by MPU 21 with data to be written into main memory 28.
(3) MAR 53 is a 16-bit register. This requires two BEX2 or OUT2 instructions by MPU 21 for complete data transfer.

B. MDR 55 SELECT

| MD1 (MSB) AUTO SPM LOAD | MD2 | MD3-4 REG. SELECT | MD5 | DESCRIPTION |
|---|---|---|---|---|
| 0 | X | 0 1 | X | MDR 55 is enabled for data exchange with MPU 21 via OUT2 or BEX2 instruction. |
| 1 | 0 | 0 1 | 0 | Contents of MDR 55 will be stored into two consecutive bytes of SPM 39. Start address of SPM 39 is specified by a previous DEV1 instruction. (Note 4) |
| 1 | 0 | 1 0 | 0 | Same as above except CRC 41 register instead of MDR 55. |

Notes:
(1) MDR 55 and CRC 41 are 16-bit registers and thus require two BEX2 or OUT2 instructions to complete a data transfer.
(2) MDR 55 is primarily intended for use as a data exchange register with main memory 28. However, it can also be used by MPU 21 as a scratch pad register.
(3) CRC 41 is primarily intended for CRC computation but it can be used as a scratch pad register by MPU 21.
(4) Contents of the adapter I/O register 61 will be shifted into the least significant byte of MDR 55. The adapter I/O register 61 and most significant byte of MDR 55 will contain zeros. This feature provides a path for MTR testing of the adapter I/O register 61.

LINE ADAPTER 19 RECEIVE-TRANSMIT CONTROLS (FUNCTION CODE 011)

The following controls are used for adapter 19 receive and transmit data exchange and sync detection, break, and second stop bit control.

| MD1 | MD2 | MD3 | MD4 | RTS DELAY MD5 | DESCRIPTION |
|---|---|---|---|---|---|
| 0 | 0 | 0 | 0 | 0 | Enable contents of adapter 19 receiver to adapter I/O register 61. adapter I/O will be loaded on a subsequent BEX0. |
| 0 | 1 | 0 | 1 | 0 | Same as above except overrun status output of selected adapter 19 will be stored in the BIU 63. (Note 1) |
| 0 | 0 | 0 | 0 | 1 | Same as above but adapter 19 receiver logic will commence sync detection. |
| 1 | 0 | 0 | 0 | 0 | Transfer contents of adapter I/O register 61 (previously loaded by an OUT0 or DEV3) into the transmit logic of adapter 19. |
| 1 | 1 | 0 | 1 | 0 | Same as above except underflow status output |

-continued

| MD1 | MD2 | MD3 | MD4 | RTS DELAY MD5 | DESCRIPTION |
|---|---|---|---|---|---|
| | | | | | of selected adapter 19 will be stored in the BIU 63 (Note 1). |
| 1 | 1 | 0 | 1 | 1 | Enable the adapter 19 flip to receive mode. |
| 1 | 0 | 1 | 0 | 0 | Transmit logic is directed to transmit break character (all spaces). |

Note:
(1) The stored data (overrun or underflow) should be tested on the next instruction.

REQUEST TO SEND DELAY BIT (MD5)

Another important feature of the present invention is the RTS dealy bit, which when sent, allows the transmitter logic to send one more character. This character is inhibited from being transmitted but is used as a delay for turning off the request to send (RTS) line.

In the asynchronous mode, the RTS delay time is one bit time plus the number of first "0" in the RTS delay character that was loaded into the transmitter logic; for example:

| EX RTS delay character: | 1 1 1 0 0 0 0 0 (8-bit character) |
|---|---|
| Delay time for turning off RTS is: | 1 bit + number of "0". 1 bit + 5 "0" = 6 bit Time delay to turn off bits. |

In the synchronous mode, it is just the number of "0". Using the above example, the RTS delay would be 5 bit times.

Notes:
(1) At the same time that the RTS delay ends, and in a half duplex mode, the data to the receiver logic is enabled. This allows the adapter 19 to flip from the XMIT mode to the RCV mode when the RTS delay time expires.
(2) A jumper is available on each adapter 19 for direct connect modes of operation. This allows the adapter 19 to flip to the RCV mode without waiting for the RTS delay time to expire.

| SPM 39 PAGE SELECT OR SET CPU 13 STATUS INTER. (FUNCTION CODE 010) | | | | | |
|---|---|---|---|---|---|
| MD1 | MD2 | MD3 | MD4 | MD5 | |
| 0 | 0 | SPM 39 Page Select (Note 1) | 0 | 0 | Preset page select register (to 0, 1, 2, or 3) as specified by SPM page select bits. |
| 1 | 0 | 0 | 0 | 0 | Set status interrupt flip-flop. Once set, this FF will remain set until a CPU 13 status read. (Note 2) |

Notes:
(1) SPM 39 organization provides up to 4 pages (32 bytes each) for each line 15, selectable by these two bits.
(2) Status interrupt to CPU 13 may also be set by parity error from either SPM 39 or MPU 21.

ADAPTER C/D, STATUS, & LINE FREQ SELECT (FUNCTION CODE 101)

The following word formats are used for testing adapter 19 receive (RCV) status, testing adapter transmit (XMIT) status, loading the adapter control descriptor, or selecting line frequency, in the respective order.

| MD1 | MD2-4 | MD5 | |
|---|---|---|---|
| 0 | RCV status bit select (Note 1) | 0 | Select receive status; do not enable other functions. |
| 0 | XMIT status bit select (Note 1) | 1 | Select transmit status; do not enable other functions. |
| 1 | N.A. | 0 | Load contents of adapter I/O register 61 into adapter 19 adapter descriptor register. |
| 1 | N.A. | 1 | Load most significant digit of adapter I/O register 61 into adapter 19 frequency select register. |

Notes:
(1)These 3 bits will select which status bit (0 through 7) will be applied to the MPU 21 EXT interrupt input.
(2)Refer to FIG. 5 for word format of transmit status, receive status, line frequency select, and adapter descriptor control words.

LINE SELECT, DATA SET DESCR & MGR STATUS (FUNCTION CODE 110)

| MSB MD1 | MD2-4 | MD5 | |
|---|---|---|---|
| 0 | S S S (Note 1) | 1 | Load contents of adapter I/O register into line select register. |
| 1 | S S S (Note 1) | 0 | Load contents of adapter I/O register into adapter data set descriptor register. |
| 0 | S S S (Note 1) | 0 | Test selected bit of MGR status without enabling above functions. |

Note:
(1)SSS = Manager status bit select. MGR status testing is enabled at all times. These 3 bits will select which status bit (0 thru 7) will be applied to the MPU 21 external interrupt input (EXT).

ADAPTER I/O REGISTER 61

Figure 4:
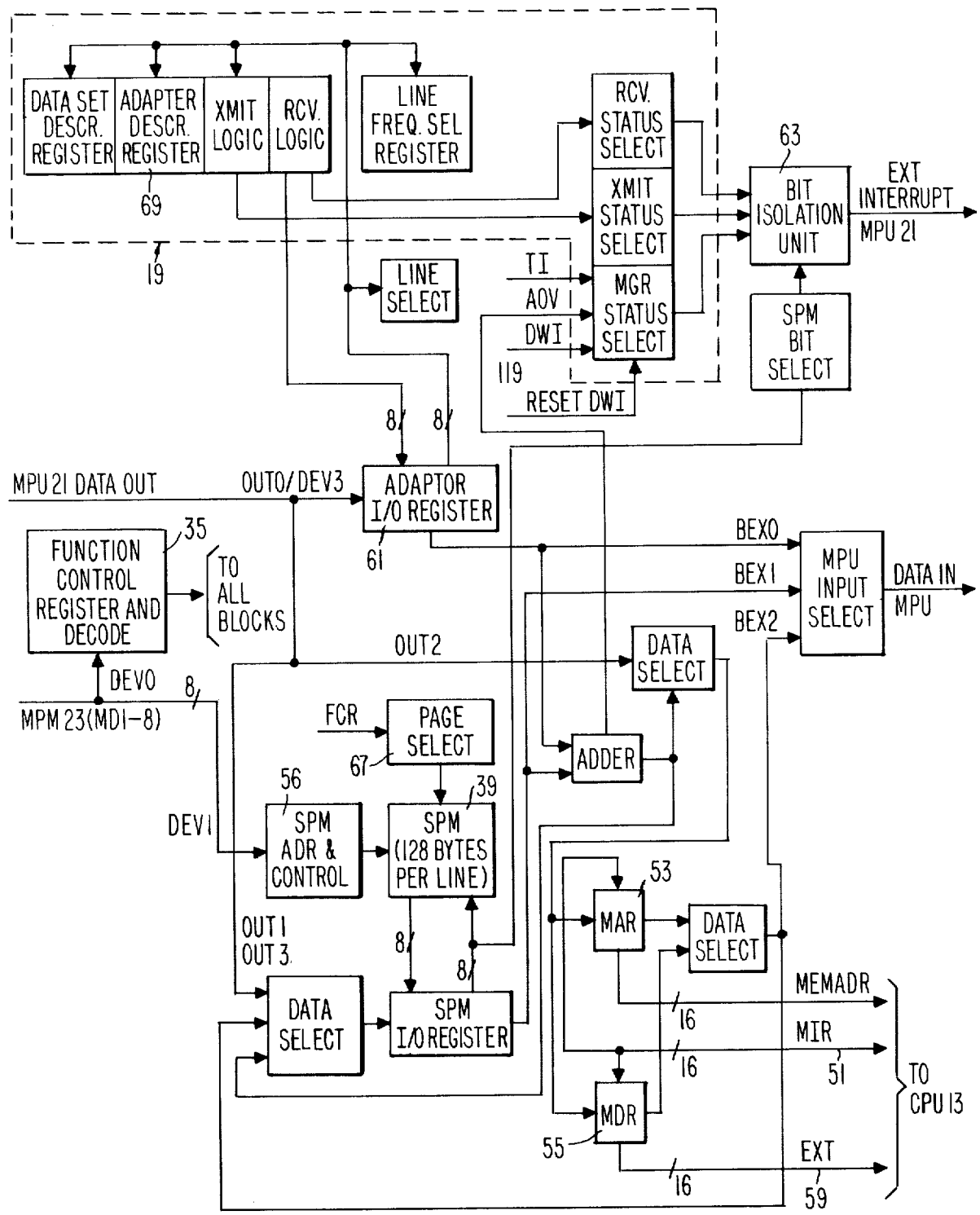
FIG. 4 is a more detailed diagram of the preprocessor of FIG. 2.

This register, see FIG. 4, is used to exchange data between MPU 21 and the selected data comm line adapter 19. It is loaded by MPU 21 by an OUT0 or DEV3 instruction, see FIG. 5. Once loaded, the contents of the adapter I/O register 61 can be transferred to any one of eight destinations by loading the appropriate command into the FCR (Function Control Register) 35 by an MPU 21 DEVO instruction. Receive data is read from the adapter 19 as follows: The FCR 35 is loaded (via a DEVO MPU 21 instruction) to select RCV data, then a one-instruction delay is required to allow access time. An MPU 21 BEX0 instruction will now transfer the contents of the RCV logic data buffer to the MPU 21 B-register via the adapter I/O register 61.

Formats of the various data and control words handled by the adapter I/O register 61 are described in detail below with reference to FIG. 7.

DATA SET 17 DESCRIPTOR (See FIG. 7)

| BIT | FUNCTION |
|---|---|
| Request To Send (RTS) | If set, notifies the data nodem to go into a transmit mode. |
| Originate (ORIG) | If set, notifies the data modem to enter the auto dial mode. |
| Data Terminal Ready (DTR) | If set, notifies the data modem that the business machine is ready. Also used in auto dial mode. |
| Data Mode (DMODE) | If set, notifies the data modem that the auto dial cycle has been completed. |
| New Synchronous (NEW SYNC) | If set, notifies the data modem that it is at the hub station in multi-station arrangements such as polling, to assure rapid synchronization between messages. |
| RATE | If set, notifies certain data modems to select a back-up rate (see standby rate). |

-continued
DATA SET 17 DESCRIPTOR (See FIG. 7)

| | |
|---|---|
| STANDBY RATE | If set, notifies certain data modems to select a back-up rate, as follows: |

| | STANDBY RATE | RATE |
|---|---|---|
| 2400 Baud | 0 | 0 |
| 1200 Baud | 1 | 1 |
| 600 Baud | 1 | 0 |

| | |
|---|---|
| 2nd STOP BIT | Used in asynchronous mode; if set, causes character transmitted to have two stop bits. |
| ENABLE XMIT and ENABLE RCV | These bits are used to enable the transmitter and receive portions of the adapter 19. They are also used in half duples mode to disable the XMIT or RCV portion that is not being used, as follows: |

| | ENABLE XMIT | ENABLE RCV |
|---|---|---|
| Full Duplex | 1 | 1 |
| Half Duplex (Transmitting) | 1 | 0 |
| Half Duplex (Receiving) | 0 | 1 |
| No Operation | 0 | 0 |

If ENABLE XMIT is reset, the transmitter logic and line break function are held cleared. The data from the transmitter logic will be in a mark state
If ENABLE RCV is reset, the receiver logic and sync detection logic is held in a cleared state.

| | |
|---|---|
| TRANSMIT PARITY | If set, notifies the transmitter logic to replace the trailing bit of character with a parity bit. If reset, no parity is transmitted and the last bit is treated as a data bit. |
| CHARACTER SIZE | Notifies the DCPP 11 to transmit and/or receive 5, 6, 7 or 8 bits, including parity and exclusing start and stop bits. |

| CHAR SIZE | Y | X |
|---|---|---|
| 5 | 1 | 1 |
| 6 | 1 | 0 |
| 7 | 0 | 1 |
| 8 | 0 | 0 |

| | |
|---|---|
| ASYNCHRONOUS | If set, notifies the adapter 19 to operate in an asynchronous mode. If reset, the adapter 19 will operate in a synchronous mode. |
| EVEN | If set, notifies the adapter 19 to transmit or receive even parity. If reset, notifies the adapter 19 to transmit or receive odd parity. |
| RCV PARITY | If set, notifies the adapter 19 that parity error will be enabled. If reset, notifies the adapter 19 that parity error will be disabled. Also, if set and in synchronous mode, sync detection will be ASCII; if reset and in synchronous mode, sync detection will be EBCDIC. |

LINE FREQUENCY SELECTION (See FIG. 7)

Used to select baud rate for each line in asynchronous operations. During synchronous operations the respective line should be set to off. A separate frequency select register is provided for each line. The following listing defines the register content required for each frequency selection.

| BIT PATTERN | | | | | MEANING |
|---|---|---|---|---|---|
| $2^{}3$ | $2^{}2$ | $2^{}1$ | $2^{}0$ | | |
| 0 | 0 | 0 | 0 | = | OFF |
| 0 | 0 | 0 | 1 | = | 75 bits/sec |
| 0 | 0 | 1 | 0 | = | 100 bits/sec |
| 0 | 0 | 1 | 1 | = | 110 bits/sec |
| 0 | 1 | 0 | 0 | = | 150 bits/sec |
| 0 | 1 | 0 | 1 | = | 200 bits/sec |
| 0 | 1 | 1 | 0 | = | 300 bits/sec |
| 0 | 1 | 1 | 1 | = | 600 bits/sec |
| 1 | 0 | 0 | 0 | = | 1200 bits/sec |
| 1 | 0 | 0 | 1 | = | 1800 bits/sec |
| 1 | 0 | 1 | 0 | = | 2400 bits/sec |

-continued

| BIT PATTERN | | | | MEANING |
|---|---|---|---|---|
| $2^3$ | $2^2$ | $2^1$ | $2^0$ | |
| 1 | 0 | 1 | 1 | = 4800 bits/sec |
| 1 | 1 | 0 | 0 | = 9600 bits/sec |
| 1 | 1 | 0 | 1 | = 19.2K bits/sec |
| 1 | 1 | 1 | 0 | = N/A |
| 1 | 1 | 1 | 1 | = SPARE |

STATUS WORDS AND BIT ISOLATION UNIT (BIU) 63 (FIG. 8)

The BIU 63, see FIG. 4, provides the capability to select one of up to eight bits in a status word and apply it to the EXT input of the MPU 21.

Status word selection and bit selection is accomplished by an MPU 21 DEVO instruction loading the appropriate command into the function control register 35.

SPM 39 BIT SELECTION

If SPM bit selection is desired, this is accomplished by an MPU 21 DEV1 instruction loading the appropriate command into the SPM address and control register 56. In this case the MPU 21 condition test operation (EXT TEST) must immediately follow the DEV1 instruction. The selected SPM bit will be applied to the MPU 21 EXT input for only one instruction period after execution of the DEV1 because EXT will revert back to the previously selected status bit.

| | BIT | | FUNCTION |
|---|---|---|---|
| MGR STATUS (See FIG. 8) | | | |
| | (3) | Reset DWI (Device Write Instruction) | Indicates a DWI has been received from the CPU 13. This usually indicates that the CPU 13 wants to establish communications with MPU 21. The DWI bit is reset upon selection by an FCR command jand its previous state is transferred to the EXT interrupt flip-flop for subsequent testing by MPU 21. |
| | (2) | AUTO OP ADV | Indicates that the last automatic operation resulted in an adder overflow due to an index add function. This flip-flop, once set, will remain set until the next AUTO OP (either index add or SPM load) is initiated. It is always unconditionally reset at this time. |
| | (1) | TI (Timer Interrupt) | This flag is set when the "strobe timer" instruction is executed and the one-millisecond timer had expired. It is used by the MPU 21 program to determine whether or not to increment various timing delay counters associated with each adapter 19. |
| | (0) | DWI (Device Write Instruction) | Indicates a DWI has been received from the CPU 13. This bit is not reset when tested and remains set until a reset DWI or a system clear is performed. |
| XMIT STATUS (See FIG. 8) | | | |
| | (7) | XMIT Exception | This flag is set if one or more of the following conditions take place: 1. Clear to send is false. 2. Data set ready is false. 3. Break condition is true. |
| | (6) | CTS (Clear To Send) | This flag is set if clear to send is true. This flag is reset if clear to send is false. |
| | (5) | | (Not used.) |
| | (4) | DSR/ )DATA Set Ready) | This flag is set if data set ready is false. This flag is reset of data set ready is true. |
| | (3) | Break | This flag, if set, indicates the receiver logic has detected a start bit and the absence of a stop bit. Used in asynchronous full-duplex mode as a potential break indication. |
| | (2) | Line/ | This flag is set if the receive data line is in a space condition. This flag is reset if the receive data line is in a mark condition (see note). |
| | (1) | LIne Change | This flag indicates that a line change has occurred since the last time this bit was tested. This flag is reset when tested. It is set if a mark to space or space to mark change has occurred since it was tested (see note). |
| | (0) | BMT (Buffer Empty) | This flag is set if the transmitter logic can accept a new character. It is reset when a transmit strobe has been done to the selected adapter 19. |

Note: The line/ and line change bits are used to accomplish monitor dial response and break detection.

| RCV STATUS (See FIG. 8) | | |
|---|---|---|
| BIT | | FUNCTION |
| (7) | RCV Exception | This flag is set if one or more of the following conditions take place: 1. Parity error is true. 2. Data set ready is false. 3. Break condition is true. 4. Carrier lost is true. |
| (6) | PARITY ERROR | This flag is set if the character in the receiver logic output buffer register has bad parity. The bit will be reset when the character is transferred to the adapter I/O register 61. |
| (5) | CARRIER/ | This flag is set if the data carrier detect line is false. It is reset if the data carrier detect line is true. |
| (4) | DSR/ (Data Set Ready) | This flag is set if data set ready is false. It is reset if data set ready is true. |
| (3) | BREAK | This flag, if set, indicates the receiver logic has detected a start bit without an appropriate stop bit. It is used in asynchronous mode and is reset after testing. |
| (2) | RING | This flag is set if the ring indicator line is true. It is reset if the ring indicator line is false. |
| (1) | CARRIER LOST | This flag is set if the data carrier detect line goes true and then goes false. It is reset when tested. |
| (0) | BFUL (Buffer Full) | This flag is set if the receiver logic has a full buffer. It is reset when the character is unloaded by the DCPP 11 controller. |

SPM 39 ADDRESS AND CONTROL

The scratch pad memory 39 is designed in the preferred embodiment to be expandable in blocks of 512 × 9.

The SPM 39 may be accessed in a character or bit mode operation. Bit mode can access one of 32 bits per page. Character mode can access all of the 32 bytes in a page including the 4 bytes used by bit mode.

SPM 39 organization provides for a maximum of four lines with up to four pages per line. Page addressing is accomplished by the FCR 35 via "line select" and "page select" commands. Line select will define a group of four pages and page select will define one of those four pages. The SPM address and control register is loaded via a DEV1 instruction (see FIG. 6 and FIG. 9) from MPU 21.

SPM ADDRESS AND CONTROL - DEV1 INSTRUCTION (FIG. 9)

CHAR or BIT/: Determines whether access will be character or bit mode.

Character mode will either:
1. Read the specified location into the SPM 39 I/O register which then may be read into MPU 21 via a BEX1 instruction.
2. Write the contents of the SPM I/O register into the specified location in the SPM 39. The SPM I/O register is previously loaded from MPU 21 may an OUT1 or OUT3 instruction.
3. If update is set, the specified address of SMP 39 is in the upper page. If update is reset, the specified address of SPM is defined by SPM page select.

Bit mode will either:
1. Read the specified location into the SPM I/O register and apply the selected bit 0 thru 7 to the EXT input of MPU 21.
2. Set or reset the specified bit location in SPM 39.

SPECIAL CONSIDERATIONS

1. To access RCV data, wait one instruction, after the DEVO command before doing a BEXO to allow access time on the receive logic.
2. SPM bit access (BIU) correlates to character mode locations 28, 29, 30 and 31.
3. An SPM bit read must be tested on the following instruction by MPU 21.
4. MPM 23 parity or SPM 39 parity stop DCPP 11 can be reset with a clear only.
5. After a DMA operation, MDR 55 must be selected before addressing information.

DATA COMMUNICATIONS LINE ADAPTER 19

The data communications line adapter 19, see FIG. 4, includes the necessary logic to interface the DCPP 11 to a data communications network either by a data set 17 or by direct connect means. Thus the line adapter 19 provides the output interface of the DCPP 11. One line adapter 19 is required for each output line. In the preferred embodiment, the output line adaptor 19 is programmable to adapt to a variety of data set 17 requirements. In alternate embodiments, it is realized of course, that the line adapter 19 could be hardwired to provide the necessary interface between a specific set of data set 17 requirements and the DCPP 11.

Figure 10:
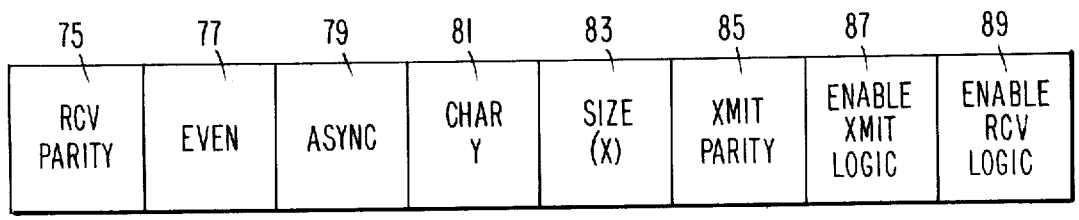
FIG. 10 is an illustration of the adapter descriptor register which serves to define the functional operation of the adapter.

The Line Adapter 19 includes the following functional blocks:

1. The Adapter Descriptor Register 69 which serves to define the functional operation of the Line Adapter 19. The Adapter Descriptor Register 69 is loaded from the Adapter I/O Register 61 and includes the following information bits (see FIG. 10) Receiver Parity Bit 75, Even Bit 77, Asynchronous Bit 79, Character (Y) Bit 81, Size (X) Bit 83, Transmitter Parity Bit 85, Enable Transmitter Logic Bit 87, and Enable Receiver Logic Bit 89.

Figure 11:
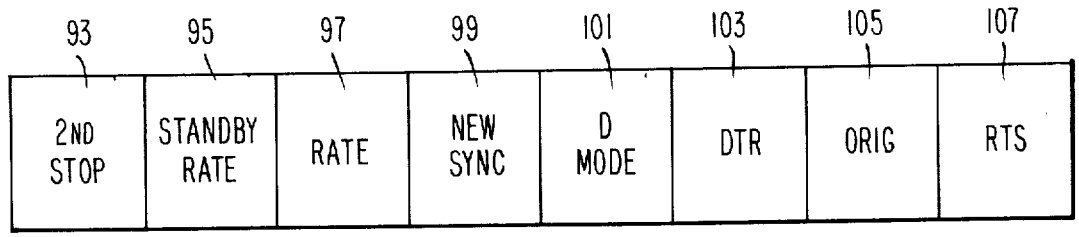
FIG. 11 is an illustration of the data set description register which serves to define the functional operation of the data set.

2. Data Set Descriptor Register 91 which defines the functional operation of the specific data set 17 associated with a specific line adapter 19. The data set descriptor register 91 includes the following information bits (see FIG. 11): Second Stop Bit 93, Standby Rate Bit 95, Rate Bit 97, New Synchronization Bit 99, D Mode Bit 101, DTR Bit 103, ORIG BIT 105 and Request-To-Send Bit 107. The data set descriptor register 91 is loaded from the Adapter I/O Register 61.

3. The transmitter logic 109 which is a synchronous-/asynchronous data communications adapter that accepts parallel binary data in the form of characters and serially transmits the data to a modem. Internally generated parity bit and appended control bits for asynchronous mode are transmitted at the same time if applicable.

4. The receiver logic 111 which is a synchronous-/asynchronous data communications adapter for receiving serial digital data from a modem or other source. The receiver logic 111 organizes the received data into fixed word lengths corresponding to characters, and transmits these characters to a buffer register from which the character may be accessed in parallel format.

Each line adapter 19 also includes the following status registers:

1. The Receiver Status Logic 113 which provides the capability to select status information relative to receive mode and apply it to the bit isolation unit 63 for interrogation by the MPU 21.

2. The Transmitter Status Logic 115 which provides the capability to select status information relative to the transmit mode and apply it to the bit isolation unit 63 for interrogation by the MPU 21.

3. The Manager Status Logic 117 which provides data to the bit isolation unit 63 for interrogation by the MPU 21. Specifically, three bits of information are provided. The DWI Bit 119 which indicates that a device write instruction has been received from the CPU 13 which wants to communicate with the MPU 21. The DWI Bit 119 is reset by a reset DWI command 121 generated from the function control register 35. An AOV bit 123 indicates that an adder overflow occurred during the last automatic operation. The AOV bit 123 remains set until a subsequent automatic operation is initiated. A TI bit 125 is set when a strobe timer instruction is executed and a one millisecond time has expired. All bits from the Manager Status Logic 117 are presented to the bit isolation unit 63 for interrogation by the MPU 21.

Thus, the function of the line adapter 19 is to interface between the data sets 17 and the DCPP 11. In the preferred embodiment, as above described, the line adapter 19 is, in essence, microprogrammable and therefore universally applicable to a wide variety of output interface requirements.

Although an operative data communications preprocessor has been described it will be appreciated by those skilled in the art that modifications and additional features may be added without departing from the scope of the invention. As an example, provisions may be added for automatic dialing (AUTOCAL) and for cyclical redundancy checking (CRC). Furthermore, while the data communication preprocessing invention has been particularly shown and described with reference to a preferred embodiment thereof, it will be understood by those skilled in the art that various changes in form and details may be made therein.

What is claimed is:

1. A data communications preprocessor for processing detailed line procedures between a central processing unit with a main memory and a plurality of data communications lines, each line therein connected to an individually associated data set, said data communications preprocessor comprising:

a plurality of line adapter means, each line adapter thereof individually associated with a data communications line in said plurality of data communications lines for facilitating the data communications therewith;

serial byte microprocessing means for controlling the processing of detailed data communications line procedures on an individual data communication line basis, said serial byte microprocessing means connected between said central processing unit and said plurality of line adapter means, said serial byte microprocessing means including a serial byte microprocessor, a micromemory means for storing control data bytes and a scratch pad memory for storing data communications parameter information relating to each data communications line in said plurality of data communications lines;

direct memory access means for permitting direct transfer of at least one byte of data between said main memory and said micromemory under the control of said serial byte microprocessor; and automatic operation means bypassing said serial byte microprocessor and utilizing said direct memory access means for automatically transferring through said direct memory access means at least one byte of data in parallel between said scratch pad memory and said main memory.

2. The data communications preprocessor according to claim 1 wherein said scratch pad memory includes a portion of memory individually associated with each data communication line in said plurality of data communications lines whereby all stored data communications parameter information of each individual data communications line is stored in said portion of said scratch pad memory individually associated therewith.

* * * * *